United States Patent
Jules et al.

(10) Patent No.: US 9,925,662 B1
(45) Date of Patent: Mar. 27, 2018

(54) GENERATING A TRAINED ROBOT PATH BASED ON PHYSICAL MANIPULATION OF THE ROBOT AND BASED ON TRAINING USER INTERFACE INPUT(S) ASSOCIATED WITH THE PHYSICAL MANIPULATION

(71) Applicant: X Development LLC, Mountain View, CA (US)

(72) Inventors: Anthony Sean Jules, Oakland, CA (US); Johan Ulrich Lewin Jessen, Mountain View, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 292 days.

(21) Appl. No.: 14/752,966

(22) Filed: Jun. 28, 2015

(51) Int. Cl.
*B25J 9/00* (2006.01)

(52) U.S. Cl.
CPC ............ *B25J 9/0081* (2013.01); *Y10S 901/04* (2013.01)

(58) Field of Classification Search
CPC ..... B25J 1/02; B25J 9/0081; B25J 9/16; B25J 9/1656; B25J 9/1664; B25J 13/02; B25J 13/06
See application file for complete search history.

(56) References Cited

U.S. PATENT DOCUMENTS

| | | | | |
|---|---|---|---|---|
| 5,241,249 A | * | 8/1993 | Detriche | B25J 9/1664 318/568.11 |
| 5,434,489 A | * | 7/1995 | Cheng | B25J 9/1656 318/568.15 |
| 5,511,147 A | * | 4/1996 | Abdel-Malek | B25J 9/1671 700/264 |
| 5,600,759 A | * | 2/1997 | Karakama | G05B 19/425 318/568.13 |
| 5,617,515 A | * | 4/1997 | MacLaren | B25J 9/1656 414/5 |
| 6,064,168 A | * | 5/2000 | Tao | B23K 9/127 219/124.33 |

(Continued)

FOREIGN PATENT DOCUMENTS

WO     2010136961     12/2010

OTHER PUBLICATIONS

Nikolaidis, S., & Shah, J. "Human-Robot Teaming using Shared Mental Models." https://interactive.mit.edu/sites/default/files/documents/HART2012_nikol_shah.pdf, (2012), 6 pages.

(Continued)

*Primary Examiner* — Nicholas Kiswanto
(74) *Attorney, Agent, or Firm* — Middleton Reutlinger

(57) ABSTRACT

Methods, apparatus, systems, and computer-readable media are provided for training a path of a robot by physically moving the robot, wherein the particular trained path and/or particular robot component movements to achieve the trained path are dependent on which of a plurality of available user interface inputs are selected for the training. The trained path defines a path to be traversed by a reference point of the robot, such as a path to be traversed by a reference point of an end effector of the robot. The particular robot component movements to achieve the trained path include, for example, the orientations of various robot components at each of a plurality of positions along the path, the velocity of various components at each of a plurality of positions along the path, etc.

21 Claims, 9 Drawing Sheets

(56) References Cited

U.S. PATENT DOCUMENTS

| | | | |
|---|---|---|---|
| 7,353,081 B2* | 4/2008 | Skourup | B25J 9/1664 |
| | | | 318/568.2 |
| 7,353,082 B2 | 4/2008 | Pretlove et al. | |
| 8,121,731 B2* | 2/2012 | Ban | B25J 9/1656 |
| | | | 700/245 |
| 8,412,379 B2* | 4/2013 | Gerio | B25J 13/06 |
| | | | 700/264 |
| 8,781,629 B2 | 7/2014 | Ota | |
| 8,843,236 B2 | 9/2014 | Barajas et al. | |
| 8,996,167 B2* | 3/2015 | Linder | B25J 9/0087 |
| | | | 700/246 |
| 9,008,840 B1 | 4/2015 | Ponulak et al. | |
| 9,138,893 B2* | 9/2015 | Nagai | B25J 9/0081 |
| 9,221,174 B2* | 12/2015 | Negishi | B25J 9/1664 |
| 9,242,376 B2* | 1/2016 | Iwasaki | G05B 19/416 |
| 9,393,687 B2* | 7/2016 | Hietmann | B25J 9/0081 |
| 2007/0030271 A1* | 2/2007 | Kamiya | B25J 9/1664 |
| | | | 345/442 |
| 2010/0188034 A1* | 7/2010 | Young | B25J 9/1656 |
| | | | 318/568.14 |
| 2013/0151442 A1 | 6/2013 | Suh et al. | |
| 2014/0371906 A1 | 12/2014 | Barajas et al. | |
| 2014/0371907 A1 | 12/2014 | Passot et al. | |
| 2014/0371912 A1 | 12/2014 | Passot et al. | |
| 2015/0094855 A1 | 4/2015 | Chemouny et al. | |

OTHER PUBLICATIONS

Baxter User Guide, "Rethink Robotics." http://mfg.rethinkrobotics.com/mfg-mediawiki-1.22.2/images/b/b3/Baxter_User_Guide_3.1_small-file.pdf., last updated Nov. 17, 2014, 179 pages.

* cited by examiner

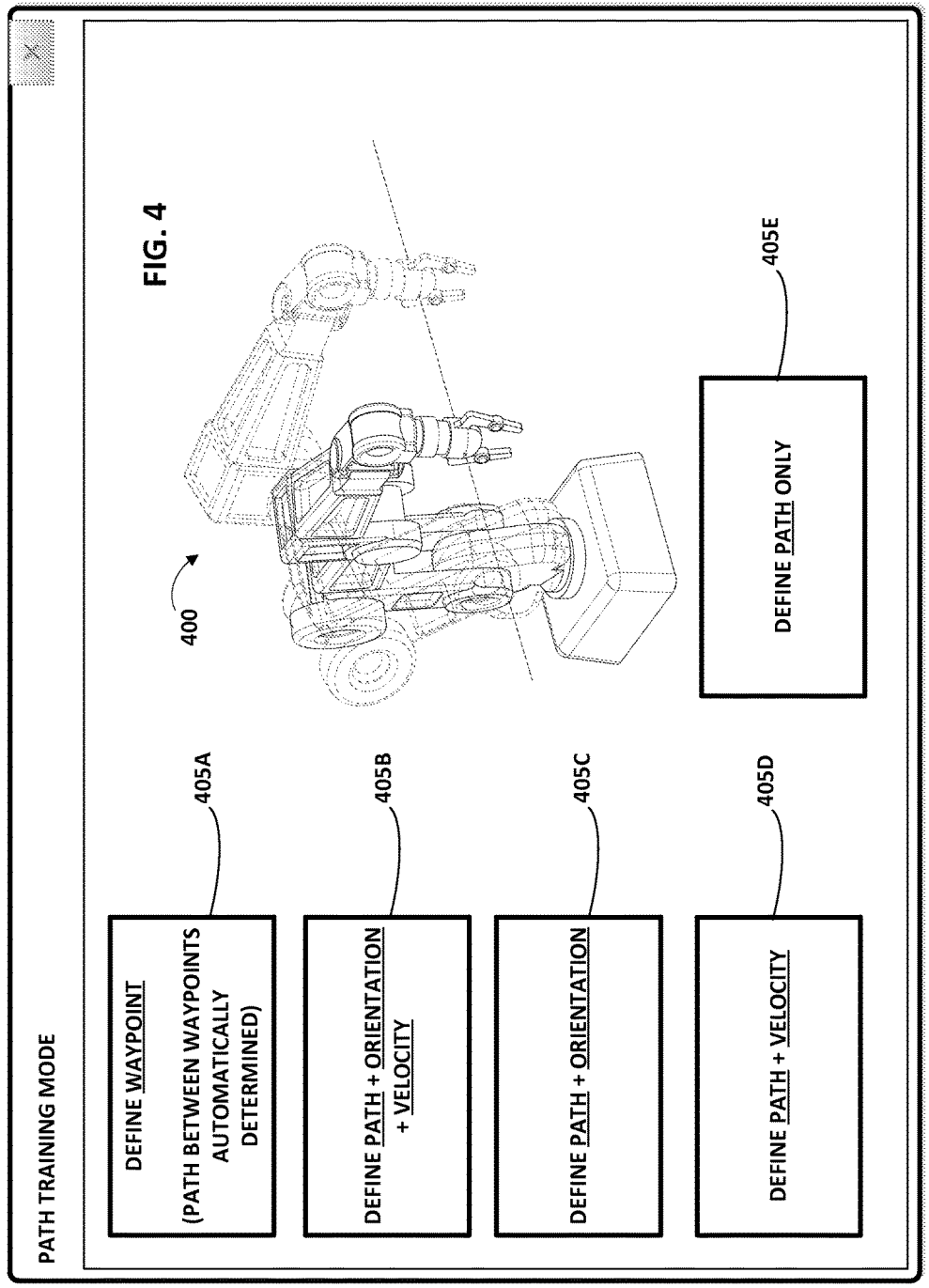

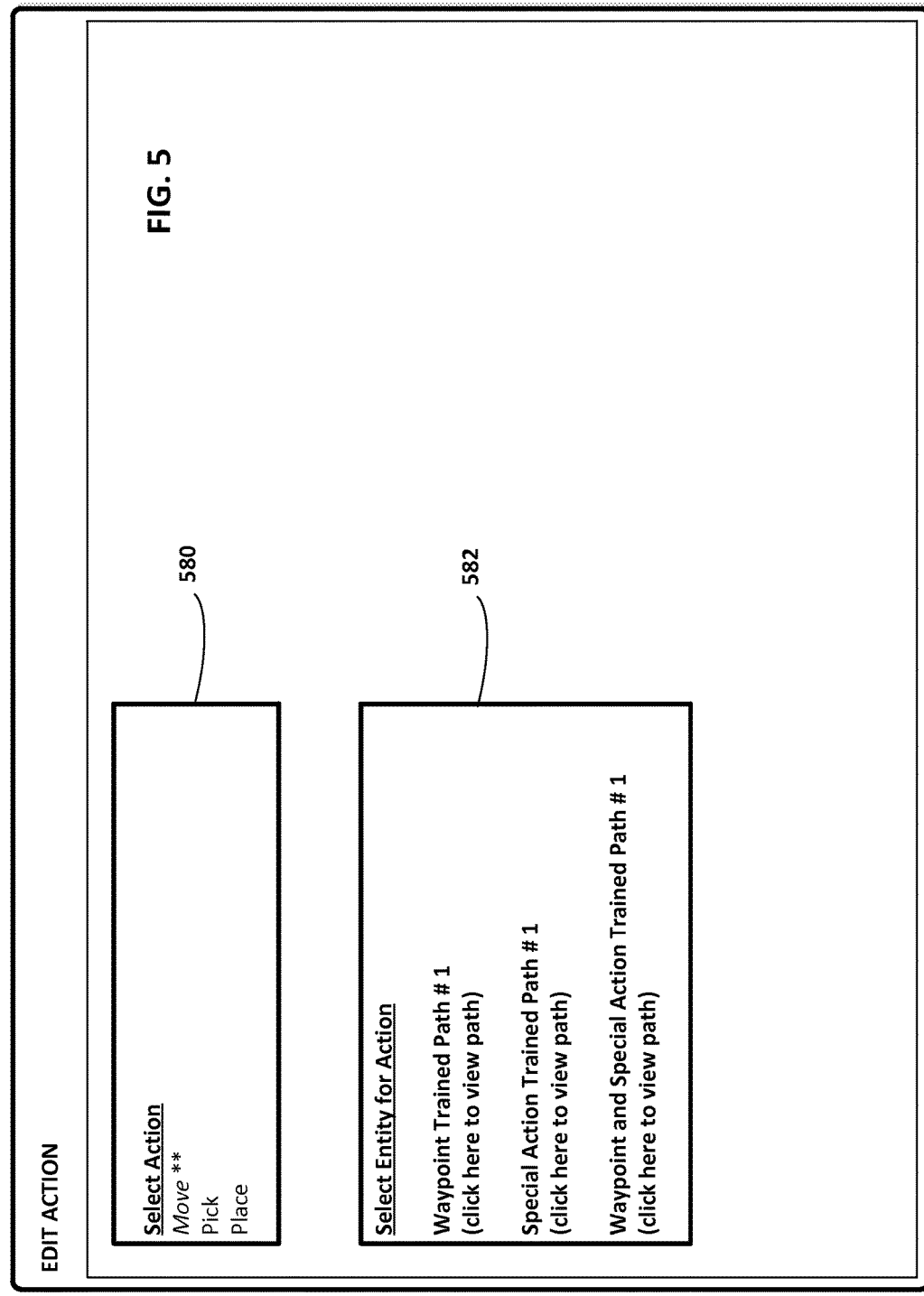

GENERATING A TRAINED ROBOT PATH BASED ON PHYSICAL MANIPULATION OF THE ROBOT AND BASED ON TRAINING USER INTERFACE INPUT(S) ASSOCIATED WITH THE PHYSICAL MANIPULATION

BACKGROUND

Robots may be programmed to perform a variety of tasks and often must traverse one or more paths in performing programmed tasks. For example, to retrieve an object and place the object in a container, an end effector of a robot must traverse a first path to reach a pick up location for the object, then after picking up the object must traverse a second path to reach a location for placing the object in the container. Various techniques may be employed for determining a path to be traversed by a robot in performance of a task. For example, some robots may be configured to automatically determine an appropriate path for performing a task based on sensed environmental conditions and/or other factors. For instance, some robots may determine a path to an object based on detecting a position of the object, then using a path planner to determine the shortest path to reach the position of the object. Also, for example, some robots may be configured to learn paths based on the user physically manipulating the robot. However, robots configured to learn paths based on the user physically manipulating the robot may be constrained to learning the path based on a single technique that is particularized to the robot. While the single technique of a robot enables paths to be defined for the robot, it may not offer a user the flexibility to define certain paths and/or certain segments of a path in a desired manner.

SUMMARY

The present disclosure is generally directed to training a path of a robot by physically moving the robot, wherein the particular trained path and/or particular robot component movements to achieve the trained path are dependent on which of a plurality of available user interface inputs are selected for the training. The trained path defines a path to be traversed by a reference point of the robot, such as a path to be traversed by a reference point of an end effector of the robot. The particular robot component movements to achieve the trained path include, for example, the orientations of various robot components at each of a plurality of positions along the path, the velocity of various components at each of a plurality of positions along the path, etc.

As one example, a first user interface input may be utilized to define one or more "waypoints" for all or portions of a path being trained and a second user interface input may be utilized to define a "special action" for all or portions of a path being trained (the same path or a different path).

For instance, the first user interface input may be a "short tap" of a button, such as a mechanical or touch sensitive (e.g., capacitive) button on a robot such as a "robot arm". A user may, while physically manipulating one or more components of a robot to move an end effector of the robot, tap the button at four different locations of the end effector to define four different waypoints. A trained path may then be determined using the four waypoints as guides (e.g., to ensure the four waypoints are encountered or "nearly" encountered by the reference point of the end effector along the trained path), while using one or more techniques to determine the particular trained path and/or the particular robot component movements to achieve that particular trained path. In other words, the first input of this example enables waypoints to be defined—and the path, and robot component movements to achieve that path, are then automatically determined using the waypoints as constraints and optionally using one or more optimization parameters (e.g., shortest path, least time).

Continuing with the example, the second user interface input that defines the special action may be a "tap and hold" of the button and the user may tap the button and hold the tap of the button while manipulating the robot end effector along a desired path. The path traversed while the tap of the button is "held" is used as the trained path. In other words, the trained path based on the second input conforms to the entirety of the path traversed instead of conforming to selected waypoints and being "inferred" for the rest of the path as with the first input. In some implementations, a trained path generated based on the second input (or an optional additional special action input) may further utilize particular robot component movements during traversal of the path while the tap of the button is "held" as the particular robot component movements of the trained path. For example, the particular orientations of the various robot components and/or the particular velocities of the various robot components that were present in the user manipulation of the robot along the path may be used at respective positions along the trained path (where in other implementations the entirety of the path may be used, but different orientations and/or velocities of robot components may be defined or automatically determined that vary from those used during the "hold down" of the button).

In some implementations, a method of generating one or more trained paths for a robot may be provided that includes the steps of: identifying a first instance of a waypoint user interface input initiated by a user; storing a first waypoint indication based on identifying the first instance, the first waypoint indication defining a first position of a reference point of the robot at the first instance; identifying a second instance of the waypoint user interface input, the second instance initiated by the user after the first instance and initiated by the user following manipulation of the robot by the user to displace the reference point from the first position; storing a second waypoint indication based on identifying the second instance, the second waypoint indication defining a second position of the reference point of the robot at the second instance; and generating a waypoint trained path segment for the robot based on the first waypoint indication and the second waypoint indication, wherein generating the waypoint trained path segment comprises: determining a first waypoint of the waypoint trained path segment based on the first waypoint indication, determining a second waypoint of the waypoint trained path segment based on the second waypoint indication, and determining an intermediate path of the waypoint trained path segment, the intermediate path being between the first waypoint and the second waypoint being determined based on one or more optimization parameters. Those implementations of the method further include the steps of: identifying a special action user interface input initiated by the user; generating a special action trained path segment for the robot based on identifying the special action user interface input, the special action trained path segment conforming to a path traversed by the reference point in response to manipulation of the robot by the user during the special action user interface input.

This method and other implementations of technology disclosed herein may each optionally include one or more of the following features.

In some implementations, the waypoint trained path segment and the special action trained path segment are consecutive segments of a single trained path of the robot.

In some implementations, the method further includes the step of generating special action orientations for the special action trained path segment. Each of the generated special action orientations conforms to a respective orientation of the robot at a respective position of the path traversed by the reference point in response to manipulation of the robot by the user during the special action user interface input. In some of those implementations, the method further includes the step of generating special action velocities for the special action trained path segment. Each of the special action velocities conforms to a respective velocity of the reference point at a respective position of the path traversed by the reference point in response to manipulation of the robot by the user during the special action user interface input. Generating the special action trained path segment and the special action orientations may include generating a plurality of vectors that collectively define the special action trained path segment and the special action orientations, each of the vectors defining one or more values for each of a plurality of actuators of the robot.

In some implementations, the method further includes the step of generating intermediate path orientations for the intermediate path of the waypoint trained path segment. The intermediate path orientations are generated based on one or more orientation optimization parameters and each of the intermediate path orientations conforms to a respective orientation of the robot at a respective position of the intermediate path.

In some implementations, the method further includes the step of generating special action orientations for the special action trained path segment. The special action orientations are generated based on one or more orientation optimization parameters.

In some implementations, the method further includes the steps of: identifying an additional special action user interface input initiated by the user; generating an additional special action trained path segment for the robot based on identifying the additional special action user interface input; and generating additional special action orientations for the additional special action trained path segment. The additional special action trained path segment conforms to an additional path traversed by the reference point in response to manipulation of the robot by the user during the additional special action user interface input and each of the additional special action orientations conforms to a respective orientation of the robot at a respective position of the additional path traversed by the reference point in response to manipulation of the robot by the user.

In some implementations, the waypoint user interface input initiated by the user is based on actuation of a user interface element in a first manner and the special action user interface input initiated by the user is based on actuation of the user interface element in a second manner. In some of those implementations, the first manner includes touching the user interface element and ceasing touching of the user interface element within a threshold amount of time. In some of those implementations, the second manner includes touching the user interface element and continuing touching the user interface element beyond the threshold amount of time. For example, an initial touching of the user interface element may indicate a start of the special action user interface input and ceasing touching the user interface element may indicate a stop of the special action user interface input.

In some implementations, the user interface element is on an exterior surface of an operational component of the robot.

In some implementations, the waypoint user interface input initiated by the user comprises actuation of a first user interface element and the special action user interface input initiated by the user comprises actuation of a second user interface element. In some versions of those implementations, the special action user interface input initiated by the user is based on the user touching the second user interface element and continuing touching the second user interface element, where an initial touching of the second user interface element indicates a start of the special action user interface input and where ceasing touching the second user interface element indicates a stop of the special action user interface input. In other versions of those implementations, the special action user interface input initiated by the user is based on the user touching the second user interface element and continuing touching the second user interface element, where the initial touching of the second user interface element indicates a start of the special action user interface input and where either of cessation of movement of the robot by the user or passage of a threshold amount of time indicates a stop of the special action user interface input.

In some implementations, the method further includes the step of traversing, by the robot, the reference point along the waypoint trained path segment and along the special action trained path segment.

In some implementations, the method further includes the step of providing the waypoint trained path segment and the special action trained path segment to a robot programming application for graphical display of the waypoint trained path segment and the special action trained path segment.

Other implementations may include a non-transitory computer readable storage medium storing instructions executable by a processor to perform a method such as one or more of the methods described above. Yet another implementation may include a control system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2A also illustrates graphical representations of waypoint indications defined in response to multiple waypoint user interface inputs initiated by a user during physical manipulation of the robot and illustrates a path traversed by the reference point of the robot during a special action user interface input initiated by the user during the physical manipulation of the robot.

FIG. 3A illustrates a path traversed by the reference point of the robot and also illustrates two orientations of a set of orientations struck by the robot along the path.

FIG. 3B illustrates the same path of FIG. 3A, but illustrates two orientations of a second set of orientations struck by the robot during the physical manipulation of the robot. The second set of orientations indicated in FIG. 3B is different than the set of orientations indicated in FIG. 3A.

FIG. 4 illustrates an example graphical interface that includes a waypoint user interface element, a first special action user interface element, a second special action user interface element, a third special action user interface element, and a fourth special action user interface element.

FIG. 5 illustrates an example graphical interface that enables a user to select a trained path for an action of a robot.

DETAILED DESCRIPTION

Figure 1A:
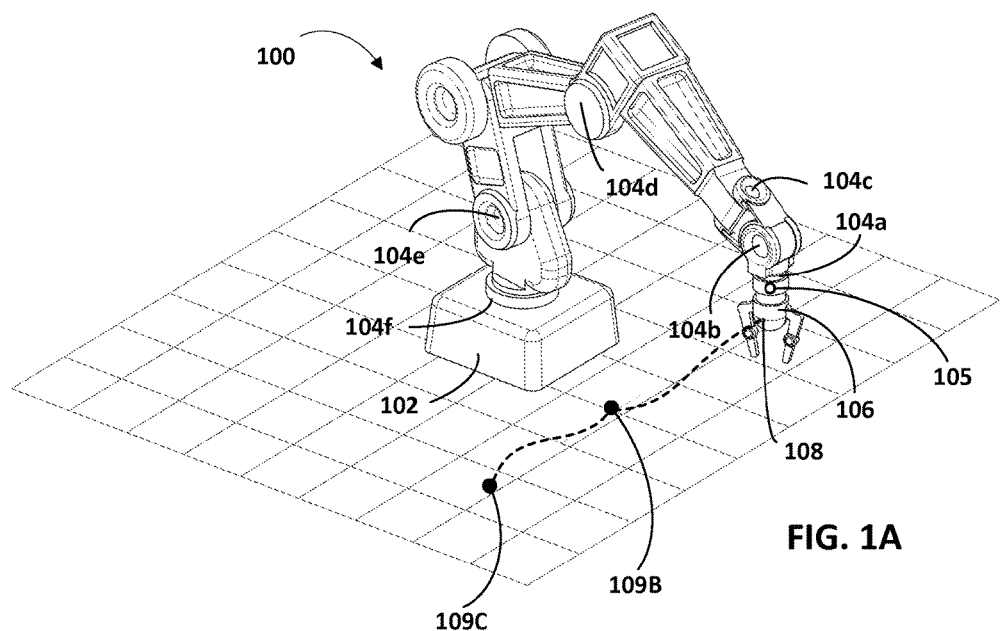
FIG. 1A illustrates an example robot and graphical representations of waypoint indications of a reference point of the robot defined in response to multiple waypoint user interface inputs initiated by a user during physical manipulation of the robot.

FIG. 1A illustrates an example robot 100 (in a form often referred to as a "robot arm") that includes a base 102 and a plurality of operational components, six of which are referenced in FIG. 1A with 104a-f. Robot 100 may include other operational components, but those are not labeled in FIG. 1A for the sakes of clarity and brevity. As used herein, an "operational component" of a robot may refer to actuators, motors (e.g., servo motors), joints, shafts, gear trains, pumps (e.g., air or liquid), pistons, drives, or other components that may create and/or undergo propulsion, rotation, and/or motion. Some operational components may be independently controllable, although this is not required. In some instances, the more operational components robot 100 has, the more degrees of freedom of movement it may have.

Robot 100 also includes an end effector 106. As used herein, "end effector" may refer to a variety of tools that may be operated by robot 100 in order to accomplish various tasks. In FIG. 1A and other Figures herein, for example, end effector 106 takes the form of a claw with two opposing "fingers" or "digits." The claw is one type of "gripper" known as an "impactive" gripper. Other types of grippers may include but are not limited to "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, and so forth. In some implementations, end effector 106 may be removable, and various types of modular end effectors may be installed onto robot 100, depending on the circumstances.

End effector 106 may define an abstract reference point 108. Reference point 108 may be a point of end effector 106 that traverses a particular path when robot 100 moves between sites. In some implementations, reference point 108 may be a center of gravity of end effector 106, and/or a point near where end effector 106 attaches to robot 100, though this is not required.

Robots typically, and robot 100 in particular, may have multiple degrees of freedom of movement. For example, each of the operational components 104a-f may include an actuator that enables controllable rotation about a respective axis. Accordingly, it is possible for robot 100 to traverse any one of a plurality of possible paths when moving reference point 108 from a first location to a second location. For instance, to move the reference point 108 from its location illustrated in FIG. 1A to a location indicated by waypoint indication 109C of FIG. 1A, the robot 100 may traverse the reference point 108 along path 110A (FIG. 1C), along path 110B (FIGS. 1B and 1C), or along other paths. Moreover, the multiple degrees of freedom of the robot 100 enable the robot to traverse along the same path (e.g., path 110A or path 110B) in multiple ways, each time striking a different set of orientations along the path. As used herein, an "orientation" refers to a particular configuration of components of a robot relative to one another at a particular position of the reference point 108 (e.g., a "snapshot"). When robot 100 is inactive, it may be in (or "strike") a single orientation until it moves again. When robot 100 moves the reference point 108 along a path, it may strike a series of orientations to effectuate the movement along the path.

Robot 100 also includes a user interface element 105 located on an exterior surface of the robot 100 between operational component 104A and end effector 106. In some implementations where the end effector 106 is removably attached, the user interface element 105 may be located near an end effector attachment area where the end effector 106 may be attached and removed. In other implementations, the user interface element 105 may be provided on the end effector 106 itself, or on another component of the robot 100 such as base 102, an area between operational component 104f and 104e, etc. In yet other implementations, and as described in more detail herein, the user interface element 105 may be located remote from the robot 100, such as a virtual user interface element provided via a tablet or other computing device. In yet other implementations, the user interface element 105 may be absent and a user may provide spoken input, gestures, and/or other user interface input to effectuate training of a path of a robot based on provided user interface input.

The illustrated user interface element 105 may be, for example, a mechanical push-button or a non-mechanical touch-sensitive button. For example, the mechanical push-button may be a spring-biased push-button switch that provides haptic feedback to enable a user to ascertain whether the push-button is actuated. Also, for example, the non-mechanical touch-sensitive button may be a capacitive touch-sensitive element that may optionally communicate with one or more components to provide haptic (e.g., vibration), visual, audible, and/or other feedback to enable a user to ascertain when and/or how the element has been actuated.

In the example of FIG. 1A, the user may actuate the user interface element 105 in a first manner (e.g., a "tap") to define each of a plurality of waypoints 109B, 109C (and optionally an unillustrated waypoint at the depicted location of reference point 108). For example, the user may actuate the user interface element 105 in the first manner at the depicted location of reference point 108 to define a first waypoint at that location. The user may then physically manipulate the robot such that the reference point 108 traverses along a first segment of the dashed line of FIG. 1A until it is positioned at the waypoint 109B. The user may actuate the user interface element 105 in the first manner at that position to define the waypoint 109B. The user may then physically manipulate the robot such that the reference point 108 traverses along a second segment of the dashed line of FIG. 1A until it is positioned at the waypoint 109C. The user may actuate the user interface element 105 in the first manner at that position to define the waypoint 109C.

In some implementations, the robot 100 may be in a gravity-compensated mode during all or portions of physical manipulations of the robot 100 by the user described herein. The gravity-compensated mode may facilitate manual movement of the robot 100 by the user. In some versions of those implementations, the amount of gravity-compensation may optionally vary to provide haptic feedback to the user when the user is approaching limits of one or more operational components 104a-f, such as positional operational limits. The robot 100 may transition into the gravity-compensated mode in response to a user interface indication that the user desires to train the robot 100. For example, the user interface indication may be actuation of the user interface element 105 in the first manner for the first time, another manner of actuation of the user interface element 105 to indicate a "start" of training, a spoken command (e.g., "train path"), and/or other user interface indication.

In response to each instance of actuation of the user interface element 105 in the first manner, a training path system (e.g., training path system 750 of FIG. 7) of the robot 100 may store a waypoint indication that defines the position of the reference point 108 at that instance. For example, in the preceding example the training path system may store an additional set of waypoint indications that include one or more values that define the waypoints 109B and 109C, and the waypoint at the position of reference point 108 illustrated in FIG. 1A. The waypoint indications may be determined, for example, based on sensor output of one or more sensors of the robot 100 and/or other feedback signal from the robot. For example, the waypoint indications may be determined base sensor outputs of the operational components 104a-f that each provide an indication of a position, velocity, etc. of a respective of the operational components 104a-f in substantially real time. For example, sensor output of a motor operational component may provide an indication of a position of the operational component based on readings from a Hall-Effect sensor of the motor operational component.

The stored waypoint indications may be defined in various manners, such as in joint space and/or in Cartesian/configuration space. For example, a joint space waypoint indication may be a vector of values that define the states of each of the operational components 104a-f. For instance, a joint space waypoint indication for waypoint 109B may define the state for each of the operational components 104a-f when the reference point 108 is positioned at waypoint 109B and the user interface element 105 is actuated. Also, for example, a Cartesian space waypoint indication for waypoint 109B may utilize coordinates (e.g., "X", "Y", and "Z" coordinates) for the waypoint 109B that define a location of the reference point 108 (relative to a reference location) when the reference point 108 is positioned at waypoint 109B. For instance, the training path system of the robot 100 may utilize forward and/or inverse kinematics equations for the robot 100 to convert the state for each of the operational components 104a-f when the reference point 108 is positioned at waypoint 109B into a Cartesian space coordinate.

The waypoint indications stored in response to actuations of the user interface element 105 are utilized to generate a waypoint trained path for the robot 100. For example, FIG. 1C illustrates a waypoint trained path 110A generated based on the multiple waypoint indications of FIG. 1A. The waypoint trained path 110A passes through each of the waypoints of FIG. 1A (109B, 109C, and the waypoint at the illustrated position of the reference point 108) and is the shortest path (in Cartesian space) through those waypoints. It is noted that the waypoint trained path 110A varies from the actual path (the dashed line of FIG. 1A) that was traversed by the reference point 108 in FIG. 1A in response to the user moving the reference point 108 to the various waypoints. This is because the waypoint trained path is generated in view of the waypoints defined in response to actuation of the user interface element 105 and in view of one or more optimization parameters (e.g., shortest path). Accordingly, generating the waypoint trained path in view of the optimization parameters may result in a waypoint trained path that will not necessarily fully conform to the actual path traversed by the reference point 108 in moving of the reference point 108 by the user.

The generated waypoint trained path may be defined in various manners, such as in joint space and/or in Cartesian/configuration space. For example, a joint space waypoint trained path may be a plurality of vectors that collectively define the path, such as vectors of values, with the values of each of the vectors defining the states of each of the operational components 104a-f at a position along the waypoint trained path. For instance, a joint space representation of the path 110A may define values for each of the operational components 104a-f at each of a plurality of time instances to achieve traversal of the reference point 108 along the path 110A. Also, for example, a Cartesian space waypoint trained path may be a plurality of coordinates that collectively define the waypoint trained path.

Various techniques may be utilized by the training path system of the robot 100 in generating a waypoint trained path based on stored waypoints. In some implementations, the training path system generates the waypoint trained path using the waypoints as constraints and based on one or more optimization parameters. For example, the training path system may generate a waypoint trained path that passes through each of the defined waypoints (or "near" the waypoints) and that is optimized to achieve the shortest path in Cartesian space. Also for example, the training path system may generate a waypoint trained path that passes through each of the defined waypoints (or "near" the waypoints (e.g., trajectory smoothing to prevent hard stops at waypoints)) and that is optimized to be traversed in the shortest time. In some implementations, optimizing a path to be traversed in the shortest time may comprise determining the most direct path in joint space of the robot 100, which may not be the most direct path in Cartesian space. Other constraints and/or optimization parameters may be taken into account. For example, the training path system may be aware of obstacles in the environment and generate the waypoint trained path so that such obstacles are avoided. Also, for example, the training path system may generate a waypoint trained path in view of constraints on one or more of the operational components 104a-f, such as positional constraints (e.g., to ensure the path can be "reached" by the reference point 108), velocity constraints, torque constraints, etc. Also, for example, the training path system may generate a waypoint trained path in view of minimizing the amount of torque and/or movement experienced by one or more of the operational components 104a-f in traversing the path.

In some implementations, the training path system of the robot 100 may also determine robot component movements to achieve a waypoint trained path. In some of those implementations, the robot component movements may be defined as a plurality of vectors that define the movements of the robot components and that also define the waypoint trained path. For example, as described above, a joint space waypoint trained path may be a plurality of vectors that collectively define the path, such as vectors of values, with the values of each of the vectors defining the states of each of the operational components 104a-f at a position along the waypoint trained path. Such definition of the states of each of the operational components 104a-f also defines the robot component movements to achieve the waypoint trained path.

Various techniques may be utilized by the training path system of the robot 100 in determining robot component movements to achieve a waypoint trained path. For example, the robot component movements may be based on one or more of the parameters utilized to generate the waypoint trained path, such as determining the shortest path, determining the quickest path, positional constraints and/or torque constraints of operational components 104a-f, minimizing the amount of torque and/or movement experienced by one or more of the operational components 104a-f in traversing the path, etc.

Figure 1B:
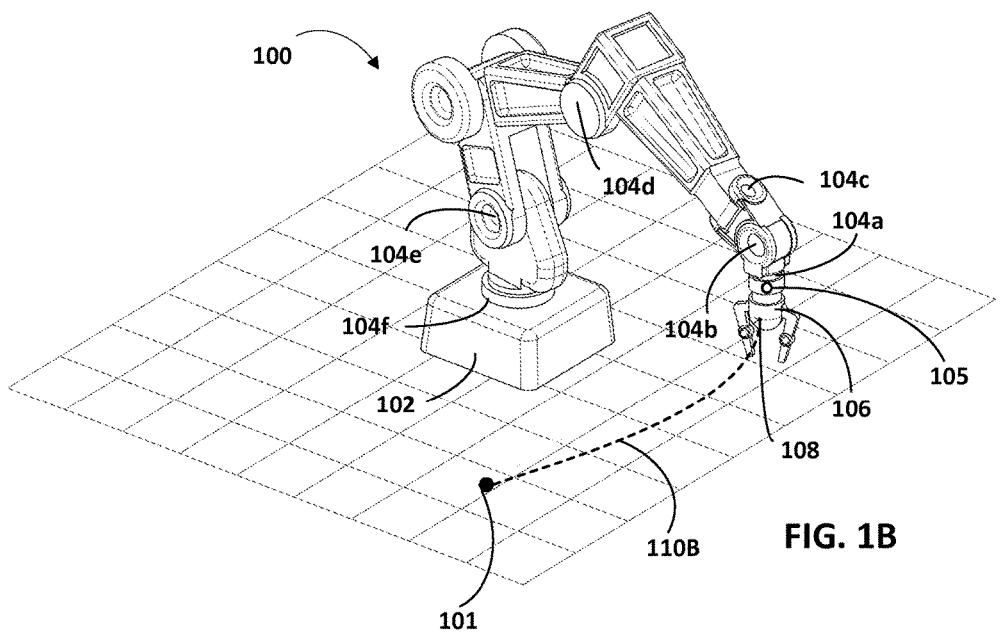
FIG. 1B illustrates the example robot of FIG. 1A and illustrates a path traversed by a reference point of the robot during physical manipulation of the robot during a special action user interface input initiated by the user.
Figure 1C:
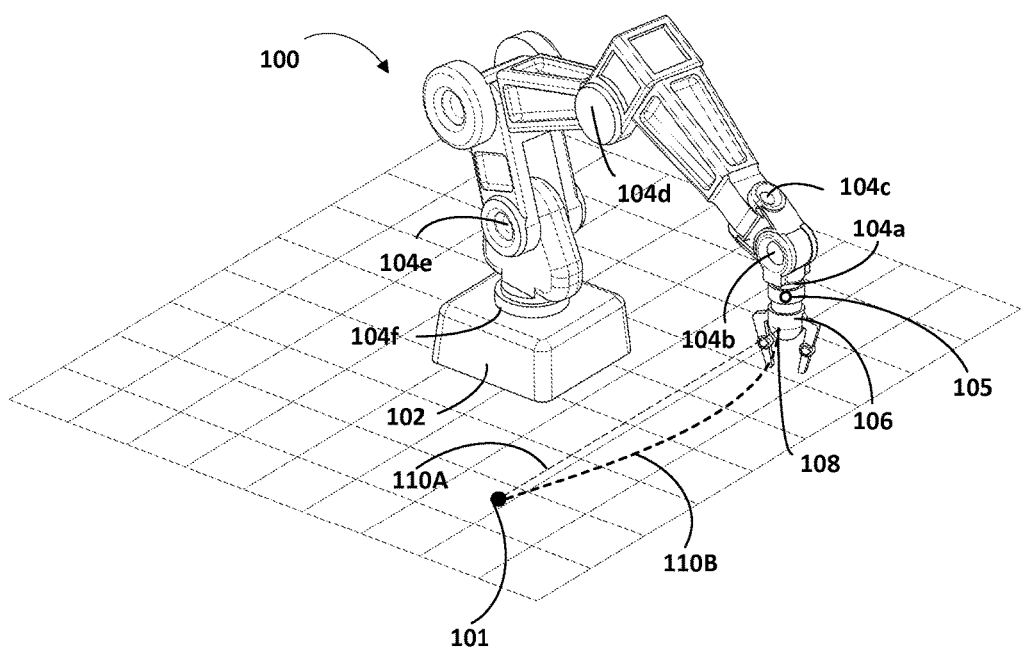
FIG. 1C illustrates the example robot of FIG. 1A and illustrates a first trained path generated based on the multiple waypoint indications of FIG. 1A and a second trained path generated based on the path of FIG. 1B.

FIG. 1B illustrates a path 110B traversed by the reference point 108 of the robot 100 during physical manipulation of the robot 100 during a special action user interface input initiated in response to the user actuating the user interface element 105 in a second manner. For example, the user may actuate the user interface element 105 in the second manner at the depicted location of reference point 108 and physically manipulate the robot such that the reference point 108 traverses along the path 110B. The special action user interface input ceases when (or at some time after) the reference point 108 reaches the end of the path 110B. For example, the second manner may be tapping the user interface element 105 and continuing to hold the tap of the user interface element 105. In such an example, the special action user interface input may continue so long as the user continues to hold the tap of the user interface element 105. As another example, the second manner may be a double tap of the user interface element 105 and the special action user interface input will begin in response to the double tap and continue until occurrence of a special action user interface cessation. In some implementations, the cessation may be another double tap of the user interface element 105, passage of a threshold amount of time since the initial double tap, passage of a threshold amount of time since movement of the robot 100 is experienced in response to user manipulation of the robot 100, and/or occurrence of some other event.

In response to the special action user interface input, a training path system of the robot 100 may store a path traversed by the reference point 108 during the special action user interface input in response to user manipulation of the robot 100. The path traversed by the reference point 108 is utilized to generate the special action trained path for the robot 100. For example, the special action trained path may fully conform to the path traversed by the reference point 108. For instance, FIG. 1C illustrates the special action trained path 110B utilized by the robot 100 is the same as that traversed by the reference point in FIG. 1B in response to user manipulation of the robot 100.

The special action trained path may be defined in various manners, such as in joint space and/or in Cartesian space. For example, a joint space special action trained path may be a plurality of vectors that collectively define the path, such as vectors of values, with the values of each of the vectors defining the states of each of the operational components 104a-f at a position along the special action trained path. For instance, a joint space representation of the path 110B may define position, velocity, and/or other values for each of the operational components 104a-f at each of a plurality of time instances to achieve traversal of the reference point 108 along the path 110B. Also, for example, a Cartesian space waypoint trained path may be a plurality of Cartesian coordinates that collectively define the waypoint trained path.

In some implementations, in response to the special action user interface input, the training path system of the robot 100 may store values that define the states of each of the operational components 104a-f along the special action trained path. In some of those implementations, the orientations and/or velocities of the operational components 104a-f may be utilized as robot component movements for the special action trained path. For example, as described above, a joint space special action trained path may be a plurality of vectors that collectively define the path, such as vectors of values, with the values of each of the vectors defining the states of each of the operational components 104a-f at a position along the special action trained path. Such definition of the states of each of the operational components 104a-f may be used as the robot component movements to achieve the special action trained path.

In some implementations, the path traversed in response to user manipulation of the robot 100 may be utilized as the special action trained path, but the states of each of the operational components 104a-f at positions along the special action trained path will not be used as robot component movements to achieve the special action trained path. For example, the orientations and/or velocities may be determined in view of the special action trained path and based on one or more constraints and/or optimization parameters. For example, the robot component movements may be determined to minimize the amount of torque and/or movement experienced by one or more of the operational components 104a-f in traversing the path, to maximize the speed at which the path is traversed, etc. For instance, the path may have been traversed by the user with a first set of velocities for the various operational components, but the velocities actually utilized to traverse the special action trained path may be a second set of velocities, such as a second set of velocities selected to maximize the speed at which the special action trained path is traversed. Also, for instance, the path may have been traversed by the user with a first set of orientations for the various operational components, but the orientations actually utilized to traverse the special action trained path may be a second set of orientations, such as a second set of orientations selected to lessen (relative to the first set of orientations) the amount of torque of one or more operational components over one or more segments of the special action trained path.

In some implementations, multiple special action user interface inputs may be provided. As one example, a first special action user interface input may result in a special action trained path that conforms to a path traversed by the reference point 108 in response to manipulation of the robot by a user during the first special action user interface input—and movements of operational components to achieve the special action trained path may be determined in view of one or more parameters and will not necessarily conform to the movements during manipulation of the robot by a user during the first special action user interface input. A second special action user interface input may result in a special action trained path that conforms to a path traversed by the reference point 108 in response to manipulation of the robot by a user during the first special action user interface input—and the orientations of operational components to achieve the special action trained path may conform to the orientations during manipulation of the robot by a user during the first special action user interface input—while other movement parameters (e.g., velocities of operational components) will not necessarily conform. A third special action user interface input may result in a special action trained path that conforms to a path traversed by the reference point 108 in response to manipulation of the robot by a user during the first special action user interface input—and the orientations and velocities of operational components to achieve the special action trained path may conform to the orientations and velocities experienced during manipulation of the robot by a user during the first special action user interface input. As one example of the three special action user interface inputs, the first may be a single tap and hold, the second may be a double tap and hold, and the third may be a triple tap and hold.

Figure 2A:
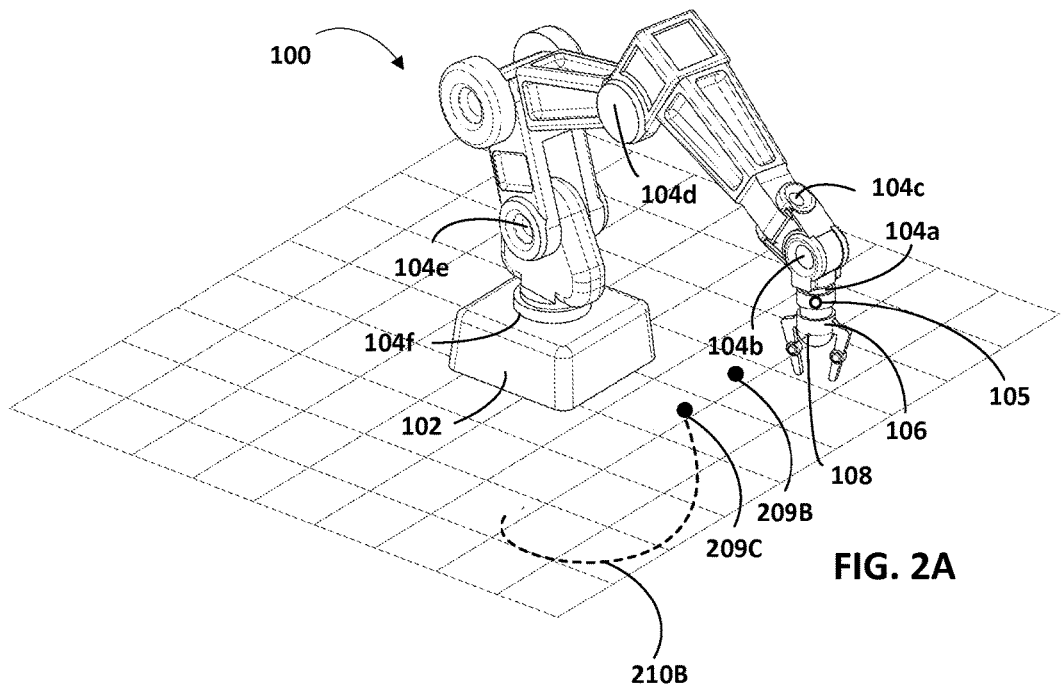
FIG. 2A illustrates the example robot of FIG. 1A.
Figure 2B:
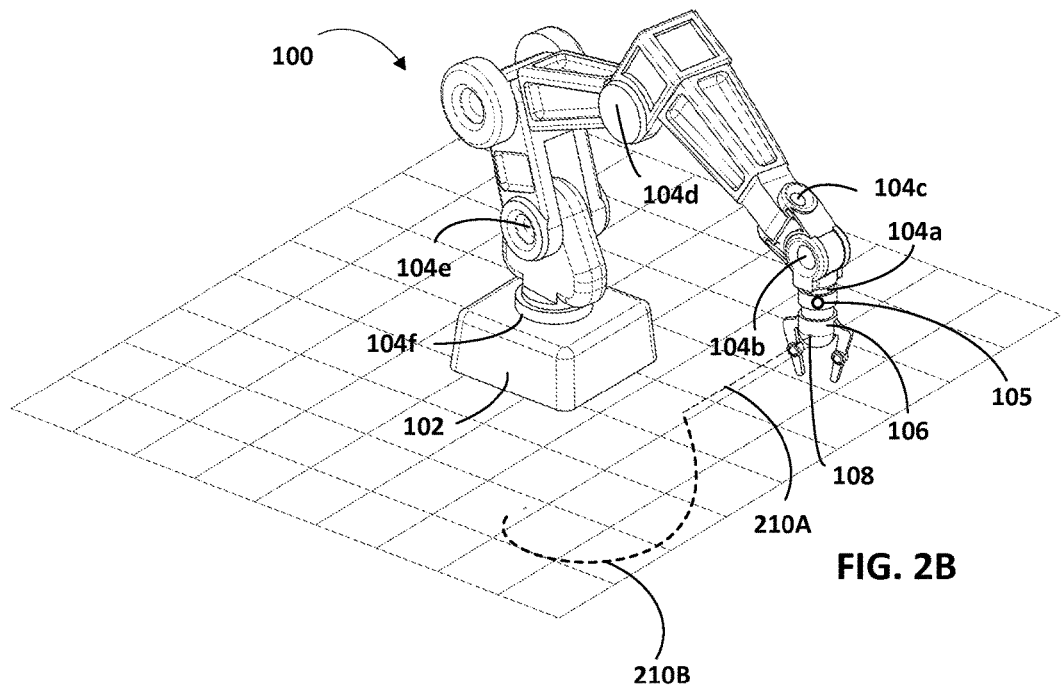
FIG. 2B illustrates the example robot of FIG. 1A and illustrates a trained path generated based on the multiple waypoint indications of FIG. 2A and based on the path of FIG. 2A.

FIGS. 1A-1C illustrate examples of a waypoint trained path 110A being generated based on waypoint user interface inputs and a separate special action trained path 110B being generated based on special action user interface input. Turning now to FIGS. 2A and 2B, an example is provided of generating a trained path (the path of FIG. 2B that comprises path segments 210A and 210B) based on both waypoint user interface inputs and special action user interface input. FIG. 2A illustrates waypoints 209B and 209C of the reference point 108 of the robot 100 defined in response to multiple waypoint user interface inputs initiated by a user during physical manipulation of the robot 100 and also illustrates a path 210B traversed by the reference point of the robot during a special action user interface input initiated by the user during the physical manipulation of the robot.

In the example of FIG. 2A, the user may actuate the user interface element 105 in a first manner (e.g., a "tap") to define each of a plurality of waypoints 209B, 209C (and optionally an unillustrated waypoint at the depicted location of reference point 108). For example, the user may actuate the user interface element 105 in the first manner at the depicted location of reference point 108 to define a first waypoint at that location. The training path system of the robot 100 may store a value that defines that waypoint in response to the actuation of the user interface element 105. The user may then physically manipulate the robot until the reference point 108 is positioned at the waypoint 209B and the user may actuate the user interface element 105 in the first manner at that position to define the waypoint 209B. The training path system of the robot 100 may store a value that defines that waypoint in response to the actuation of the user interface element 105. The user may then physical manipulate the robot the robot until the reference point 108 is positioned at waypoint 209C. The user then actuates the user interface element in the second manner to initiate a special action user interface input and traverses the reference point 108 along the path 210B during the special action user interface input. The training path system of the robot 100 stores values that define the path 210B. In some implementations, the user may actuate the user interface element 105 in the first manner when the reference point 108 is at the waypoint 209C (prior to actuation of the user interface element in the second manner) and the training path system may store a value that defines the waypoint 209C in response to the actuation in the first manner. In other implementations, the user may not actuate the user interface element 105 in the first manner when the reference point 108 is at the waypoint 209C. In some of those implementations, the training path system may utilize the beginning location of the path 210B as the waypoint 209C.

FIG. 2B illustrates the trained path generated based on the multiple waypoint indications of FIG. 2A and based on the path of FIG. 2A. The trained path includes special action trained path segment 210B and waypoint trained path segment 210A. Special action trained path segment 210B conforms to path segment 210B of FIG. 2A. Waypoint trained path segment 210A may be generated based on the waypoints as described herein. For example, path segment 210A may be generated between the waypoint defined at the position of the reference point 108 in FIG. 2A and the waypoint 209C, using the additional waypoint 209B as a further constraint. As described herein, other values may optionally be utilized as constraints and/or optimization parameters in generating the segment 210A. As further described herein, the waypoint trained path segment 210A may vary from the actual path traversed by the reference point 108 in moving of the reference point 108 by the user to waypoint 209C.

Figure 3A:
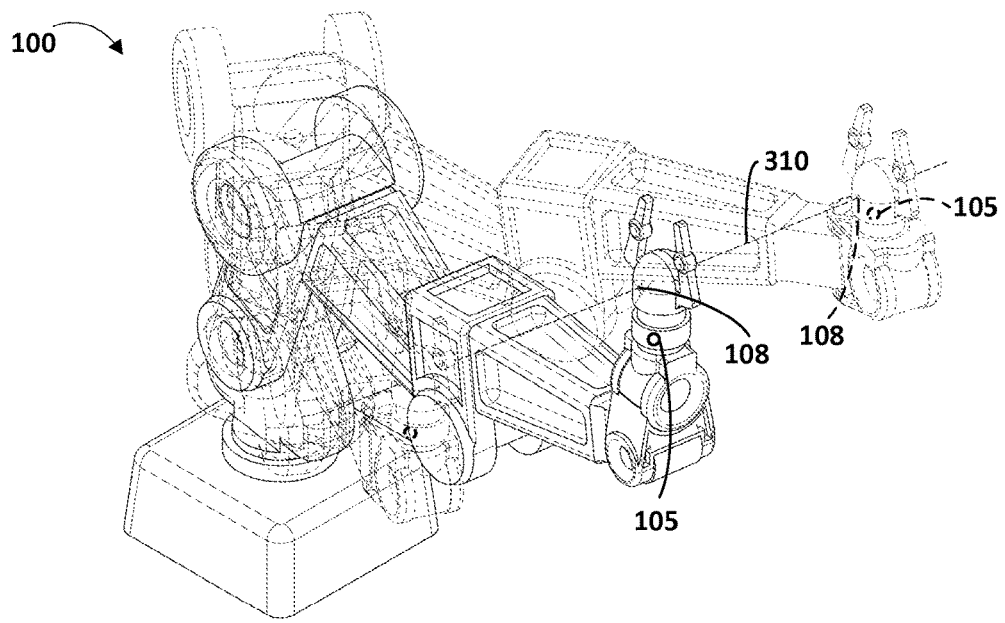
FIG. 3A illustrates the example robot of FIG. 1A.
Figure 3B:
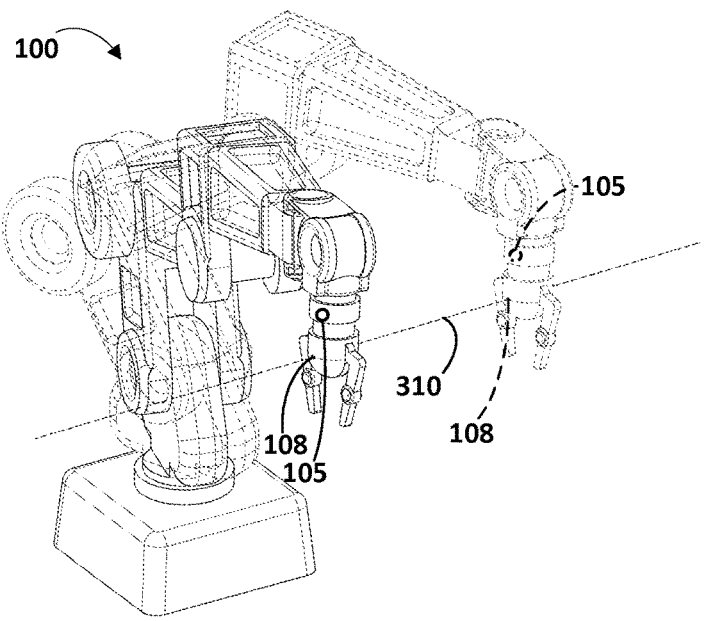
FIG. 3B illustrates the example robot of FIG. 1A.

FIGS. 3A and 3B illustrate an example of the reference point 108 of the robot 100 traversing the same path 310, but using different sets of orientations of the components of the robots in traversing the path 310. The numbering of various components of the robot 100 is omitted in FIGS. 3A and 3B for the sake of simplifying those figures.

In FIG. 3A, reference point 108 of end effector 106 is traversed along path 110 by extending end effector 106 into path 110 from below (e.g., "underhanded"). FIG. 3A includes a phantom and non-phantom image of the robot 100 showing two different orientations of a set of orientations struck by the robot 100 in traversing along the path 310 according to the example of FIG. 3A.

In FIG. 3B, reference point 108 of end effector 106 is traversed along path 110 by extending end effector 106 into path 110 from above (e.g., "overhanded"). FIG. 3B includes a phantom and non-phantom image of the robot 100 showing two different orientations of a set of orientations struck by the robot 100 in traversing along the path 310 according to the example of FIG. 3B.

As appreciated by viewing FIGS. 3A and 3B, the set of orientations struck by the operational components in FIGS. 3A and 3B vary from one another. Although only two examples of sets of orientations for traversing path 310 are illustrated in FIGS. 3A and 3B, many other sets of orientations of various components may be utilized to traverse the reference point 108 along the path 310.

As described herein, in some implementations a special action user interface input may result in a special action trained path that conforms to a path traversed by the reference point 108 in response to manipulation of the robot by a user during the first special action user interface input—and the orientations of operational components to achieve the special action trained path may conform to the orientations during manipulation of the robot by a user during the first special action user interface input. For example, if the robot 100 was manipulated by the user as illustrated in FIG. 3A during the special action user interface input, the trained path would conform to the path 310 and generated robot component orientations for traversing that trained path would conform to a set of orientations that include the orientations illustrated in FIG. 3A. If, instead, the robot 100 was manipulated by the user as illustrated in FIG. 3B during the special action user interface input, the trained path would conform to the path 310 and generated robot component orientations for traversing that trained path would conform to a set of orientations that include the orientations illustrated in FIG. 3B.

As also described herein, in some implementations orientations of robot components in traversing a waypoint trained path and/or some special action trained paths may be automatically generated in view of one or more parameters. Accordingly, dependent on the parameters, the series of orientations conforming to FIG. 3A, the series of orientations conforming to FIG. 3B, and/or other series of orientations may be automatically determined to traverse a waypoint trained path and/or a special action trained path that conforms to path 310.

FIG. 4 illustrates an example graphical interface that includes a waypoint user interface element 405A, a first special action user interface element 405B, a second special action user interface element 405C, a third special action user interface element 405D, and a fourth special action user interface element 405E. The user interface elements 405A-D may be provided in lieu of, or in addition to, the interface element 105 (or other interface element(s) on the robot 100). The user interface elements 405A-D may be graphically represented on a display of a computing device, such as a display of a tablet computing device, a display of a desktop computing device, etc. The graphical user interface elements 405A-D may be individually selected via one or more user input interfaces. For example, when provided on a touch sensitive display of a tablet computing device, the graphical user interface elements 405A-D may be selected by "tapping" the display.

The computing device may be in communication with the training path system of the robot 100 and may, in response to selection of one of the user interface elements 405A-D, provide an indication of the selected interface input to the training path system. For example, a user may physically manipulate the robot to multiple positions, and select the user interface element 405A at each of those positions to cause waypoints to be recorded for those positions. A waypoint trained path segment may be determined based on those waypoints as described herein.

Also, for example, a user may select the user interface element 405B to initiate a first special action user interface input, then physically manipulate the robot along a path, then select the user interface element 405B again to cease the first special action user interface input. Based on the first special action user interface input, the manipulated path will be utilized as a special action trained path segment and the manipulated robot component orientations and robot component velocities along that path will be utilized as robot movement parameters for that special action trained path. Also, for example, a user may select the user interface element 405C to initiate a second special action user interface input, then physically manipulate the robot along a path, then select the user interface element 405C again to cease the second special action user interface input. Based on the second special action user interface input, the manipulated path will be utilized as a special action trained path segment and the manipulated robot component orientations will be utilized as robot movement parameters for that special action trained path. Also, for example, a user may select the user interface element 405D, to initiate a third special action user interface input, then physically manipulate the robot along a path, then select the user interface element 405D again to cease the third special action user interface input. Based on the third special action user interface input, the manipulated path will be utilized as a special action trained path segment and the manipulated robot component velocities to will be utilized as robot movement parameters for that special action trained path. Also, for example, a user may select the user interface element 405E, to initiate a fourth special action user interface input, then physically manipulate the robot along a path, then select the user interface element 405E again to cease the fourth special action user interface input. Based on the fourth special action user interface input, the manipulated path will be utilized as a special action trained path segment and robot movement parameters for that special action trained path will be determined in view of one or more optimization parameters.

In FIG. 4, a graphical depiction 400 of a robot is also provided. The graphical depiction 400 illustrates a trained path generated based on one of the techniques described above, and also illustrates two orientations of a set of orientations that will be struck by the robot in traversing the trained path. The graphical depiction 400 may assist the user in ascertaining the trained path that was actually generated based on the physical manipulation of a corresponding robot by the user and the user interface input provided by the user.

In some implementations, trained paths may be provided to the user in a graphical interface to enable the user to edit the trained paths via the graphical interface and/or to assign the trained path as part of one action of a plurality of actions that define a task of a robot. For example, FIG. 5 illustrates an example graphical interface that enables a user to select a trained path for an action of a robot. The action may be one of a plurality of actions defined for a task of the robot. For example, the action of FIG. 5 may be one that follows a "pick up object" action and that is followed by a "drop off object" action. In FIG. 5, the user has selected an action of "move" via action selection interface element 580. The user is presented with three trained paths in entity selection interface element 582 and may select one of the trained paths for associating with the "move" action. The three trained paths of entity selection interface element 582 may be those that are generated based on physical manipulation of a robot by the user in view of a selected interface input as described herein. Entity selection interface element 582 also includes an option, for each of the selectable paths, to enable the user to view the path. Selection of such an option by the user may present the user with a graphical representation of the path such as, for example, a graphical representation of the robot with the path illustrated in dashed lines (e.g., as in FIG. 2B) and/or with the path illustrated via moving the graphical representation of the robot along the path (optionally with the movement parameters for the path).

Figure 6:
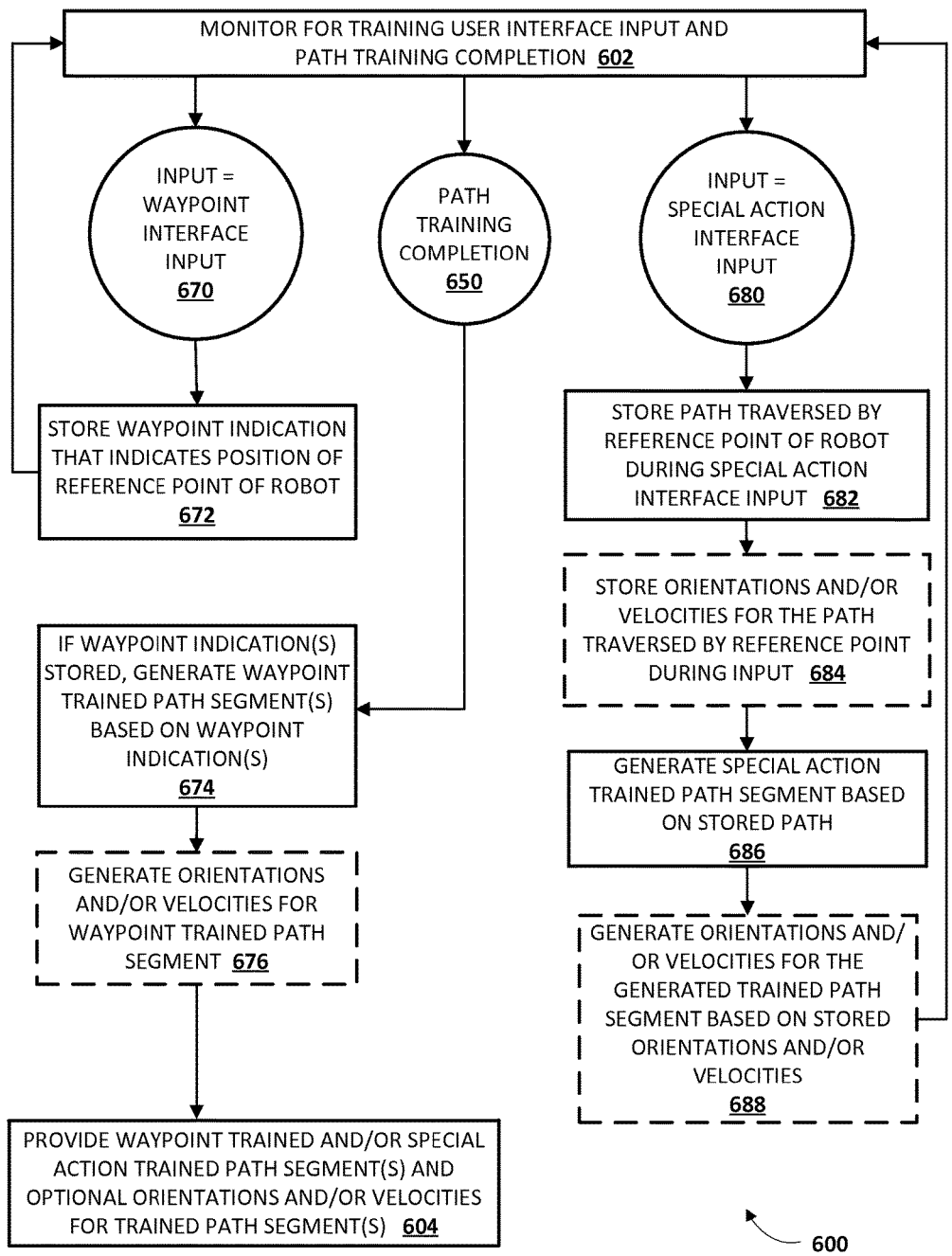
FIG. 6 depicts a flow chart illustrating an example method of training a movement path of a robot by physically moving the robot, wherein the particular trained movement path and/or particular robot component movements to achieve the trained movement path are dependent on which of a plurality of available user interface inputs are selected.

Referring now to FIG. 6, an example method 600 of training a movement path of a robot by physically moving the robot is described, wherein the particular trained movement path and/or particular robot component movements to achieve the trained movement path are dependent on which of a plurality of available user interface inputs are selected for the training. For convenience, the operations of the flow chart are described with reference to a system that performs the operations. This system may include various components of various computer systems, such as training path system 750 in FIG. 7. Moreover, while operations of method 600 are shown in a particular order, this is not meant to be limiting. One or more operations may be reordered, omitted or added.

At block 602, the system monitors for training user interface input. For example, the system may always monitor for training user interface input such as actuation of a training user interface element, or may only monitor for training user interface input in response to some input to indicate a "start of path training" such as sensing of a user physically touching and/or manipulating a robot, actuating a "start path training" interface element, and/or a spoken command (e.g., "train path"). At block 602, the system also monitors for path training completion. For example, the system may monitor for the path training completion once user interface input is received and/or an input to indicate a start of training is received. The path training completion may be, for example, some input (or lack of input) to indicate an "end of training" such as sensing that a user is no longer physically touching and/or manipulating a robot, actuating a "stop path training" interface element, and/or a spoken command (e.g., "end training of path").

At block 670, the system receives input, while performing the monitoring of block 602, and determine the input is a waypoint user interface input. For example, the input may be received based on the user actuating a waypoint user interface element and/or based on a user actuating a combinational waypoint user interface/special action interface element in a manner that is particularized to waypoint user interface input. The system may determine the input is a waypoint user interface input based on matching one or more characteristics of the input to stored waypoint user interface input characteristics.

In response to receiving the waypoint user interface input at block 670, the system stores a waypoint indication at block 672. The waypoint indication indicates a position of a reference point of the robot. The waypoint indication may be determined, for example, based on sensor output of one or more sensors of the robot, such as sensor outputs of the operational components 104a-f that each provide an indication of a position of a respective of the operational components 104a-f. The stored waypoint indication may be defined in various manners, such as in joint space and/or in Cartesian/configuration space. The system proceeds to block 602 after block 672. It is noted that the system may perform multiple iterations of blocks 670 and 672 before a path training completion is received at block 650 (described in more detail below).

At block 680, the system receives input, while performing the monitoring of block 602, that is a special action user interface input. For example, the input may be received based on the user actuating a special action user interface element and/or based on a user actuating a combinational waypoint user interface/special action interface element in a manner that is particularized to special action user interface input. The system may determine the input is a special action user interface input based on matching one or more characteristics of the input to stored special action user interface input characteristics.

In response to receiving the special action user interface input at block 680, the system stores, at block 682, a path traversed by the reference point of the robot during the special action user interface input. The path may be defined in various manners, such as in joint space and/or in Cartesian space. For example, a joint space path may be a plurality of vectors that collectively define the path, such as vectors of values that each define the states of each of the operational components of the robot at a position along the special action trained path.

At optional block 684, the system stores orientations and/or velocities for the path traversed by the reference point during the special action user interface input. For example, a joint space path may be stored at block 682, and the stored joint space path may include values that each define the orientations and/or velocities of each of the operational components of the robot along the waypoint trained path.

At block 686, the system generates a special action trained path segment based on the path stored at block 682. For example, the special action trained path may fully conform to the path stored at block 682.

At optional block 688, the system generates orientations and/or velocities for the generated path of block 686 based on the stored orientations and/or velocities of block 684. For example, the orientations and/or velocities may fully conform to those stored at block 686.

It is noted that the system may perform multiple iterations of blocks 680-688 before a path training completion is received at block 650. Moreover, it is noted that some implementations may include multiple special action user interface inputs as described herein. In those implementations, additional blocks may be provided to address those additional special action user interface inputs and/or all or aspects of optional blocks 684 and/or 688 may only be performed when certain special action user interface inputs are received at the input of block 680. For example, if the special action user interface input of block 680 is in response to user selection of graphical interface element 405B (FIG. 4), blocks 684 and 688 may be performed in their entireties. If, however, the special action user interface input of block 680 is in response to user selection of graphical interface element 405E (FIG. 4), blocks 684 and 688 may not be performed.

At block 650, the system receives input, while performing the monitoring of block 602, that indicates path training completion. The indication of path training completion may be, for example, some input (or lack of input) to indicate an "end of training" such as sensing that a user is no longer physically touching and/or manipulating a robot, actuating a "stop training" interface element, and/or a spoken command (e.g., "end training of path").

At block 674, the system generates one or more waypoint trained path segments based on one or more waypoint indications, if any waypoint indications have been stored at block 672. For example, the system may generate the waypoint trained path segments in view of the stored waypoints and in view of one or more optimization parameters (e.g., shortest path, shortest time).

At optional block 676, the system generates orientations and/or velocities for the waypoint trained path segment(s) of block 674. For example, the system may generate the waypoint trained path segments in view of the waypoint trained path and one or more optimization parameters.

At block 604, the system provides the waypoint trained and/or special action trained path segment(s) and optional orientations and/or velocities for the trained path segment (s). For example, where the input prior to the path training completion of block 650 included only waypoint user interface input, the system provides a waypoint trained path segment at block 604. Also, for example, where the input prior to the path training completion of block 650 included only special action user interface input, the system provides one or more special action trained path segments at block 604. Also, for example, where the input prior to the path training completion of block 650 includes both waypoint user interface input and special action user interface input, the system provides one or more special action trained path segments and one or more waypoint trained path segments at block 604, along with an indication of an order of such path segments. For instance, the input prior to the path training completion of block 650 may comprise a first set of waypoint user interface inputs, then a first special action user interface input, the a second set of waypoint user interface inputs, then a second special action user interface input. At block 604 a path may be provided that comprises a first waypoint trained path segment based on the first set of waypoint user interface inputs, followed by a first special action trained path segment based on the first special action user interface input, followed by a second waypoint trained path segment based on the second set of waypoint user interface inputs, followed by a second special action trained path segment based on the second special action user interface input.

At block 604 the trained path segment(s) may be provided to a robot for implementation by the robot and/or to a robot programming application to enable the user to edit the trained paths via the robot programming application and/or to assign the trained path as part of one action of a plurality of actions that define a task of a robot.

Figure 7:
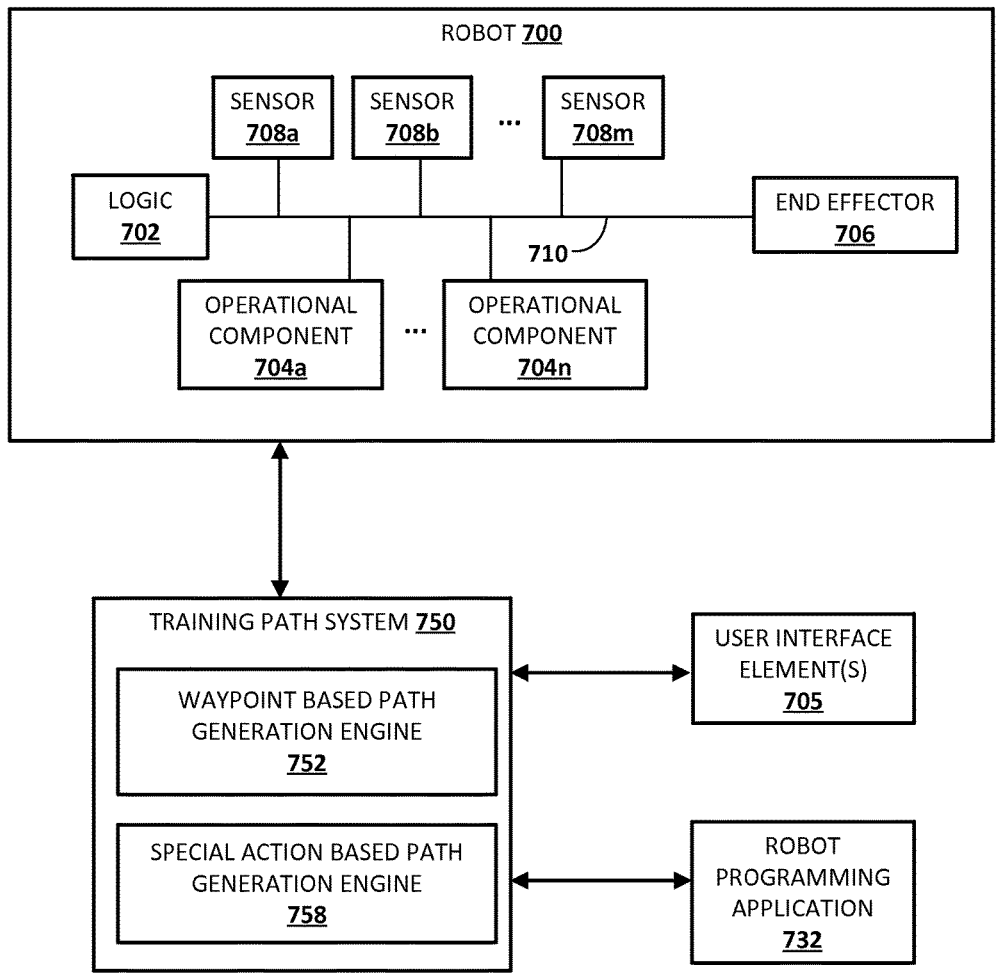
FIG. 7 illustrates an example environment in which disclosed techniques may be implemented.

FIG. 7 is a schematic diagram of an example environment in which disclosed techniques may be implemented. A robot 700 may be in communication with a training path system 750. Robot 700 may take various forms, including but not limited to a robot arm similar to robot 100 described above, a humanoid form, an animal form, a wheeled device, a submersible vehicle, an unmanned aerial vehicle ("UAV"), and so forth. In various implementations, robot 700 may include logic 702. Logic 702 may take various forms, such as one or more processors, one or more field-programmable gate arrays ("FPGA"), one or more application-specific integrated circuits ("ASIC"), one or more so-called "real time controllers," and so forth.

In various implementations, logic 702 may be operably coupled with one or more operational components 704$a$-$n$ and/or one or more sensors 708$a$-$m$, e.g., via one or more buses 710. Sensors 708$a$-$m$ may take various forms, including but not limited to light sensors, pressure sensors, pressure wave sensors (e.g., microphones), proximity sensors, accelerometers, gyroscopes, thermometers, barometers, and so forth. While sensors 708$a$-$m$ are depicted as being integral with robot 700, this is not meant to be limiting. In some implementations, one or more sensors 708$a$-$m$ may be located external to robot 700, e.g., as standalone units or as part of training path system 750.

Logic 702 may provide control commands to the operational components 704$a$-$n$ to accomplish one or more programmed tasks. Those control commands include commands that direct the operational components 704$a$-$n$ to move to traverse one or more trained paths generated according to techniques described herein and that optionally direct the operational components 704$a$-$n$ to move along the trained paths with movement parameters generated according to techniques described herein.

Logic 702 may further provide control commands to the operational components 704$a$-$n$ to enable the robot 700 to be in a gravity-compensated mode during all or portions of physical manipulations of the robot 100 by the user as described herein. Moreover, the logic 702 may optionally determine positions of one or more operational components 704$a$-$n$, end effector 706, and/or a reference point based on sensor feedback and/or other techniques and provide indications of the positions to training path system 750 to enable the training path system 750 to store waypoints and/or paths based on position(s) of the operational components 704$a$-$n$ during training of a path of the robot 700.

Training path system 750 may include one or computing systems connected by one or more networks (not depicted) and may determine trained paths according to techniques described herein. An example of such a computing system is depicted schematically in FIG. 8. Various modules or engines may be implemented as part of training path system 750 as software, hardware, or any combination of the two. For example, in FIG. 7, training path system 750 includes a waypoint based path generation engine 752 and a special action based path generation engine 758.

The training path system 750 is in communication with one or more user interface elements 705. The training path system 750 generates a trained path and/or robot component movements to achieve that trained path based on position information provided by robot 700 during physical manipulation of the robot 700 by a user and based on which interface inputs are identified in response to user actuation of user interface element(s) 705 in association with the physical manipulation of the robot 700. The user interface element(s) 705 may be physical and/or graphical interface elements and may be located on the robot 700 or remote from the robot 700, such as graphical interface elements on a computing device remote from the robot 700.

Waypoint based path generation engine 752 may be configured to identify waypoint user interface input initiated in response to user actuation of one or more user interface elements 705. For example, the waypoint based path generation engine 752 may identify input as user interface input if it is generated based on user actuation of a particular user interface element 705 and/or user actuation of a particular user interface element 705 in a particular manner.

In response to identifying a waypoint user interface input, the waypoint based path generation engine 752 may store a waypoint indication that defines the position of a reference point of the robot 700 when the waypoint user interface input was received. For example, as described above the robot 700 may provide position information to the training path system 750. Such provided position information may be stored as the waypoint indication.

The waypoint based path generation engine 752 utilizes stored waypoint indications to generate a waypoint trained path for the robot 700. Various techniques may be utilized by the waypoint based path generation engine 752 in generating a waypoint trained path based on stored waypoints, such as techniques described herein. In some implementations, the waypoint based path generation engine 752 generates the waypoint trained path using the waypoints as constraints and based on one or more optimization parameters. In some implementations, the waypoint based path generation engine 752 may also determine robot component movements to achieve a waypoint trained path.

Special action based path generation engine 758 may be configured to identify special action user interface input initiated in response to user actuation of one or more user interface elements 705. For example, the special action based path generation engine 758 may identify input as user interface input if it is generated based on user actuation of a particular user interface element 705 and/or user actuation of a particular user interface element 705 in a particular manner.

In response to identifying a special action user interface input, the special action based path generation engine 758 may store a path that defines the path traversed by a reference point of the robot 700 during the special action user interface input. For example, as described above the robot 700 may provide position information to the training path system 750 and the position information provided during the special action user interface input may collectively define the path and may be stored.

The special action based path generation engine 758 utilizes the stored path to generate the special action trained path for the robot 700. For example, the special action trained path may fully conform to the traversed path. In some implementations, in response to the special action user interface input, the special action based path generation engine 758 may store values that define the states of each of the operational components 704a-n along the special action trained path. In some of those implementations, the special action based path generation engine 758 may utilize orientations and/or velocities of the operational components 104a-f as robot component movements for the special action trained path. In some implementations, the special action based path generation engine 758 may utilize the path traversed in response to user manipulation of the robot 700 as the special action trained path, but the states of each of the operational components 704a-n at positions along the special action trained path will not be used as robot component movements to achieve the special action trained path. For example, the special action based path generation engine 758 may determine the orientations and/or velocities may be determined in view of the special action trained path and based on one or more constraints and/or optimization parameters. It is noted that training path system 750 may be configured to respond differently to different special action user interface inputs in implementations that include multiple special action user interface inputs as described herein.

The training path system 750 may provide trained paths to the robot 700 for implementation of the trained paths via commands generated by logic 702 in performing one or more tasks. The training path system 750 may additionally and/or alternatively provide trained paths to robot programming application 732 to enable a user to edit the trained paths via the robot programming application 732 and/or to assign, via the application 732, the trained path as part of one action of a plurality of actions that define a task of the robot 700. For example, the robot programming application 732 may provide a graphical interface such as the interface of FIG. 5 that enables a user to select a trained path as part of an action for a task of the robot 700.

While robot 700 and training path system 750 are depicted separately in FIG. 7, this is not meant to be limiting. In various implementations, one or more aspects depicted in FIG. 7 as implemented on one of robot 700 or training path system 750 may be implemented on the other, may be distributed across both, and/or may be distributed across one or both in combination with other components not depicted in FIG. 7. In implementations where robot 700 and training path system 750 are separate, they may communicate over one or more wired or wireless networks (not depicted) or using other wireless technology, such as radio, Bluetooth, infrared, etc. In other implementations, training path system 750 may be implemented entirely or in part using logic 702 of robot 700.

Figure 8:
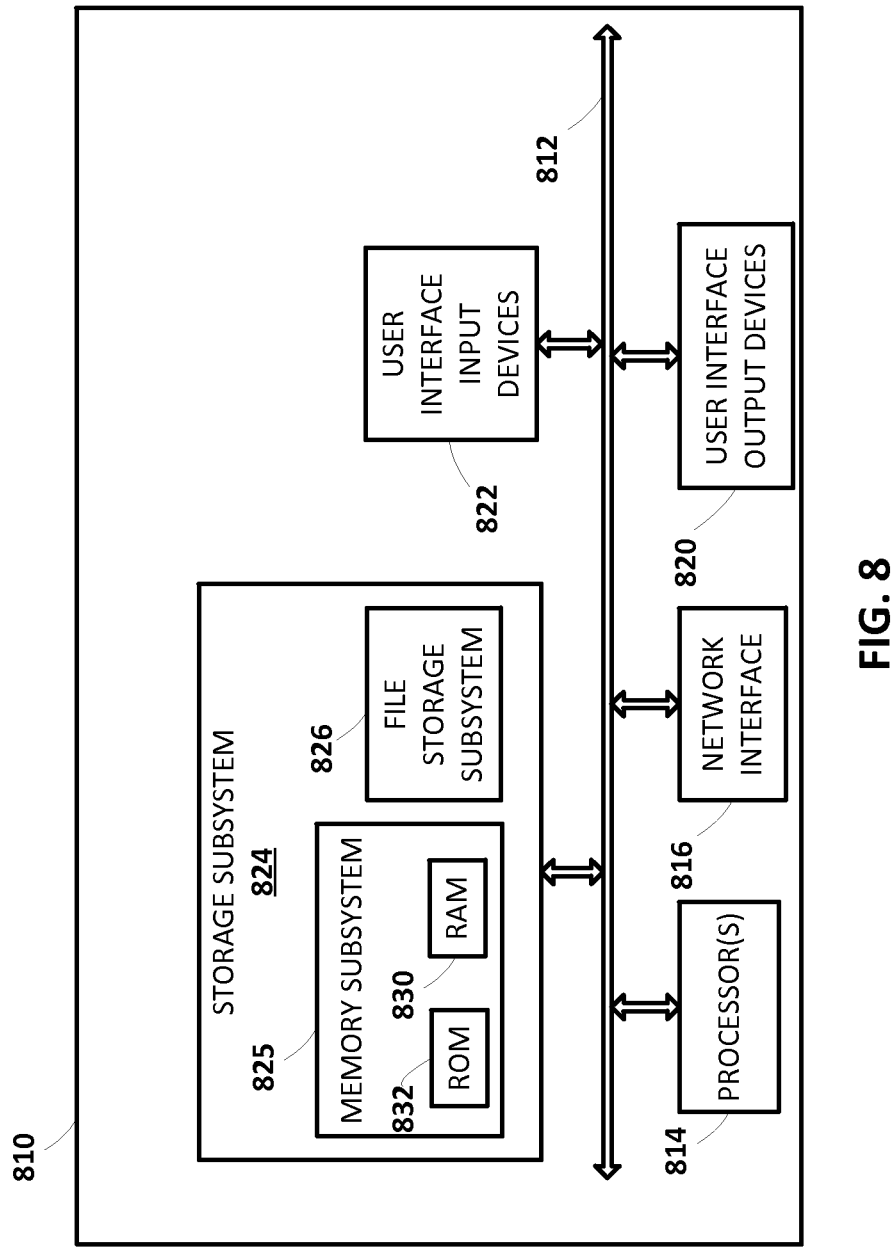
FIG. 8 schematically depicts an example architecture of a computer system.

FIG. 8 is a block diagram of an example computer system 810. Computer system 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computer system 810. Network interface subsystem 816 provides an interface to outside networks and is coupled to corresponding interface devices in other computer systems.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules described herein. For example, the storage subsystem 824 may include the logic to perform selected aspects of method 600, and/or to implement one or more aspects of logic 702, engine 752, and/or engine 758. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a CD-ROM drive, an optical drive, or removable media cartridges. Modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computer system 810 communicate with each other as intended. Although bus subsystem 812 is shown schematically as a single bus, alternative implementations of the bus subsystem may use multiple busses.

Computer system 810 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 810 depicted in FIG. 8 is intended only as a specific example for purposes of illustrating some implementations. Many other configurations of computer system 810 are possible having more or fewer components than the computer system depicted in FIG. 8.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method of generating one or more trained paths for a robot, comprising:
    identifying a first instance of a waypoint user interface input initiated by a user;
    storing a first waypoint indication based on identifying the first instance, the first waypoint indication defining a first position of a reference point of the robot at the first instance;
    identifying a second instance of the waypoint user interface input, the second instance initiated by the user after the first instance and initiated by the user following manipulation of the robot by the user to displace the reference point from the first position;
    storing a second waypoint indication based on identifying the second instance, the second waypoint indication defining a second position of the reference point of the robot at the second instance;
    generating a waypoint trained path segment for a trained path for the robot based on the first waypoint indication and the second waypoint indication, wherein generating the waypoint trained path segment comprises:
        determining a first waypoint of the waypoint trained path segment based on the first waypoint indication,
        determining a second waypoint of the waypoint trained path segment based on the second waypoint indication, and
        determining an intermediate path of the waypoint trained path segment, the intermediate path being between the first waypoint and the second waypoint and being determined based on one or more optimization parameters;
    identifying a special action user interface input initiated by the user;
        generating a special action trained path segment for the trained path for the robot based on identifying the special action user interface input, the special action trained path segment conforming to a path traversed by the reference point in response to physical manipulation of the robot by the user during the special action user interface input;
    wherein the waypoint trained path segment and the special action trained path segment are consecutive segments of the trained path.

2. The method of claim 1, further comprising:
    generating special action orientations for the special action trained path segment, each of the special action orientations conforming to a respective orientation of the robot at a respective position of the path traversed by the reference point in response to manipulation of the robot by the user during the special action user interface input.

3. The method of claim 2, further comprising:
    generating special action velocities for the special action trained path segment, each of the special action velocities conforming to a respective velocity of the reference point at a respective position of the path traversed by the reference point in response to manipulation of the robot by the user during the special action user interface input.

4. The method of claim 2, wherein generating the special action trained path segment and the special action orientations comprises:
    generating a plurality of vectors that collectively define the special action trained path segment and the special action orientations, each of the vectors defining one or more values for each of a plurality of actuators of the robot.

5. The method of claim 1, further comprising generating intermediate path orientations for the intermediate path of the waypoint trained path segment, the intermediate path orientations generated based on one or more orientation optimization parameters and each of the intermediate path orientations conforming to a respective orientation of the robot at a respective position of the intermediate path.

6. The method of claim 1, further comprising generating special action orientations for the special action trained path segment, the special action orientations generated based on one or more orientation optimization parameters.

7. The method of claim 6, further comprising:
    identifying an additional special action user interface input initiated by the user;
    generating an additional special action trained path segment for the robot based on identifying the additional special action user interface input, the additional special action trained path segment conforming to an additional path traversed by the reference point in response to manipulation of the robot by the user during the additional special action user interface input; and
    generating additional special action orientations for the additional special action trained path segment, each of the additional special action orientations conforming to a respective orientation of the robot at a respective position of the additional path traversed by the reference point in response to manipulation of the robot by the user.

8. The method of claim 1, wherein the waypoint user interface input initiated by the user is based on actuation of a user interface element in a first manner and wherein the special action user interface input initiated by the user is based on actuation of the user interface element in a second manner.

9. The method of claim 8, wherein the user interface element is on an exterior surface of an operational component of the robot.

10. The method of claim 8, wherein the first manner comprises touching the user interface element and ceasing touching of the user interface element within a threshold amount of time.

11. The method of claim 10, wherein the second manner comprises touching the user interface element and continuing touching the user interface element beyond the threshold amount of time.

12. The method of claim 11, wherein an initial touching of the user interface element indicates a start of the special action user interface input and wherein ceasing touching the user interface element indicates a stop of the special action user interface input.

13. The method of claim 1, wherein the waypoint user interface input initiated by the user comprises actuation of a first user interface element and wherein the special action user interface input initiated by the user comprises actuation of a second user interface element.

14. The method of claim 13, wherein the special action user interface input initiated by the user is based on the user touching the second user interface element and continuing touching the second user interface element, wherein an initial touching of the second user interface element indicates a start of the special action user interface input and wherein ceasing touching the second user interface element indicates a stop of the special action user interface input.

15. The method of claim 13, wherein the special action user interface input initiated by the user is based on the user touching the second user interface element and continuing touching the second user interface element, wherein the initial touching of the second user interface element indicates a start of the special action user interface input and wherein either of cessation of movement of the robot by the user or passage of a threshold amount of time indicates a stop of the special action user interface input.

16. The method of claim 1, further comprising:
traversing, by the robot, the reference point along the waypoint trained path segment and along the special action trained path segment.

17. The method of claim 1, further comprising:
providing the waypoint trained path segment and the special action trained path segment to a robot programming application for graphical display of the waypoint trained path segment and the special action trained path segment.

18. A system comprising:
a robot that includes one or more operational components that may be physically moved by a user in a training mode of the robot;
one or more user interface elements;
memory storing instructions;
one or more processors operable to execute the instructions stored in the memory to cause one or more of the processors to:
identify a first instance of a waypoint user interface input in response to a waypoint user actuation of at least one of the user interface elements by a user;
store a first waypoint indication based on identifying the first instance, the first waypoint indication defining a first position of a reference point of the robot at the first instance as sensed by the robot;
identify a second instance of the waypoint user interface input in response to the waypoint user actuation, the second instance occurring following manipulation of the robot by the user to displace the reference point from the first position;
store a second waypoint indication based on identifying the second instance, the second waypoint indication defining a second position of the reference point of the robot at the second instance as sensed by the robot;
generate a waypoint trained path segment for a trained path for the robot based on the first waypoint indication and the second waypoint indication;
identify a special action user interface input in response to a special action user actuation of at least one of the user interface elements by a user; and
generate a special action trained path segment for the trained path for the robot based on identifying the special action user interface input, the special action trained path segment conforming to a path traversed by the reference point in response to physical manipulation of the robot by the user during the special action user interface input;
wherein the waypoint trained path segment and the special action trained path segment are consecutive segments of the trained path.

19. The system of claim 18, wherein in executing the instructions stored in the memory one or more of the processors are further to:
generate special action orientations for the special action trained path segment, the special action orientations generated based on one or more orientation optimization parameters;
identify an additional special action user interface input initiated by the user;
generate an additional special action trained path segment for the robot based on identifying the additional special action user interface input, the additional special action trained path segment conforming to an additional path traversed by the reference point in response to manipulation of the robot by the user during the additional special action user interface input; and
generate additional special action orientations for the additional special action trained path segment, each of the additional special action orientations conforming to a respective orientation of the robot at a respective position of the additional path traversed by the reference point in response to manipulation of the robot by the user.

20. The system of claim 18, wherein the waypoint user actuation is actuation of a given user interface element in a first manner and wherein the special action user actuation is actuation of the given user interface element in a second manner.

21. At least one non-transitory computer-readable medium comprising instructions that, in response to execution of the instructions by a computing system, cause the computing system to perform the following operations:
identifying a first instance of a waypoint user interface input initiated by a user;
storing a first waypoint indication based on identifying the first instance, the first waypoint indication defining a first position of a reference point of a robot at the first instance;
identifying a second instance of the waypoint user interface input, the second instance initiated by the user after the first instance and initiated by the user following manipulation of the robot by the user to displace the reference point from the first position;
storing a second waypoint indication based on identifying the second instance, the second waypoint indication defining a second position of the reference point of the robot at the second instance;
generating a waypoint trained path segment for a trained path for the robot based on the first waypoint indication and the second waypoint indication, wherein generating the waypoint trained path segment comprises:
determining a first waypoint of the waypoint trained path segment based on the first waypoint indication, determining a second waypoint of the waypoint trained path segment based on the second waypoint indication, and determining an intermediate path of the waypoint trained path segment, the intermediate path being between the first waypoint and the second waypoint and being determined based on one or more optimization parameters;

identifying a special action user interface input initiated by the user;

generating a special action trained path segment for the trained path for the robot based on identifying the special action user interface input, the special action trained path segment conforming to a path traversed by the reference point in response to physical manipulation of the robot by the user during the special action user interface input;

wherein the waypoint trained path segment and the special action trained path segment are consecutive segments of the trained path.

\* \* \* \* \*